Nov. 6, 1923.

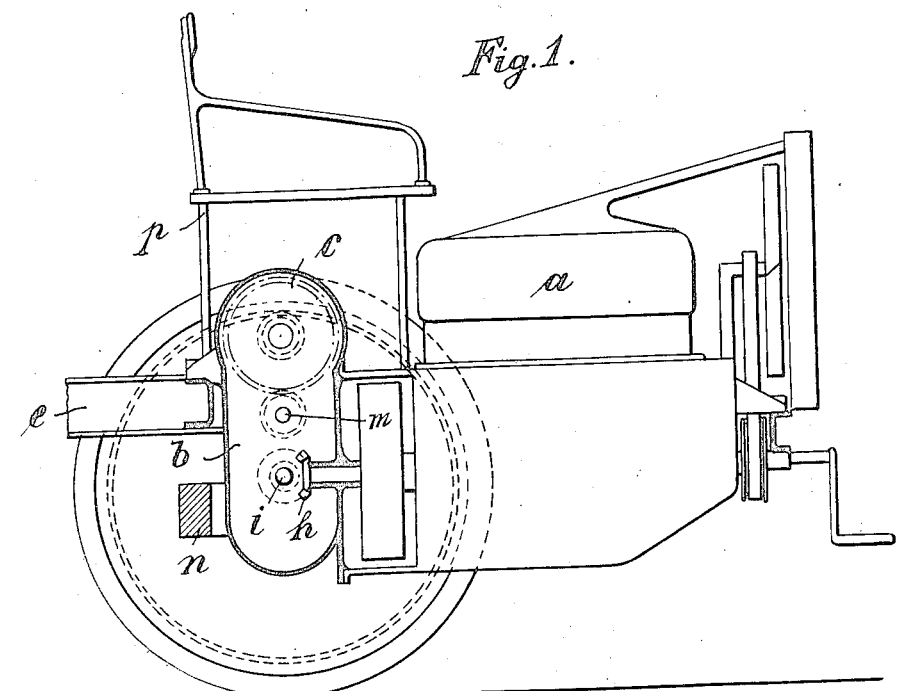
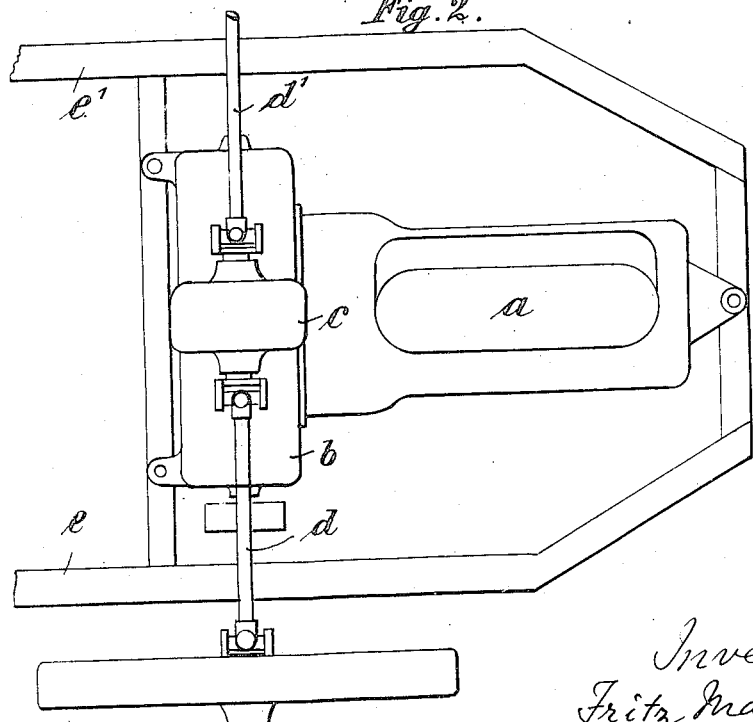

F. MAYER

MOTOR CAR

Filed July 24, 1920

1,473,194

3 Sheets-Sheet 2

Inventor:
Fritz Mayer,

Nov. 6, 1923.
F. MAYER
MOTOR CAR
Filed July 24, 1920    3 Sheets-Sheet 3
1,473,194
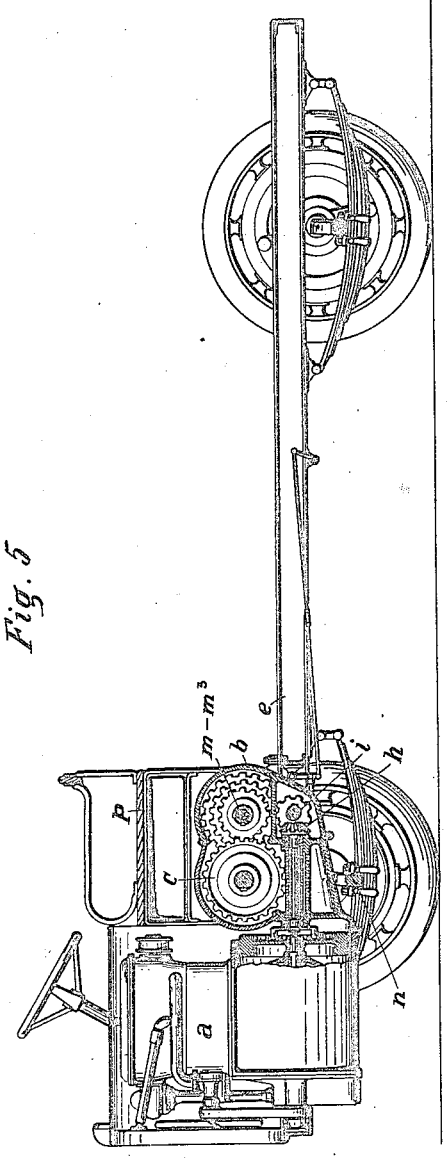
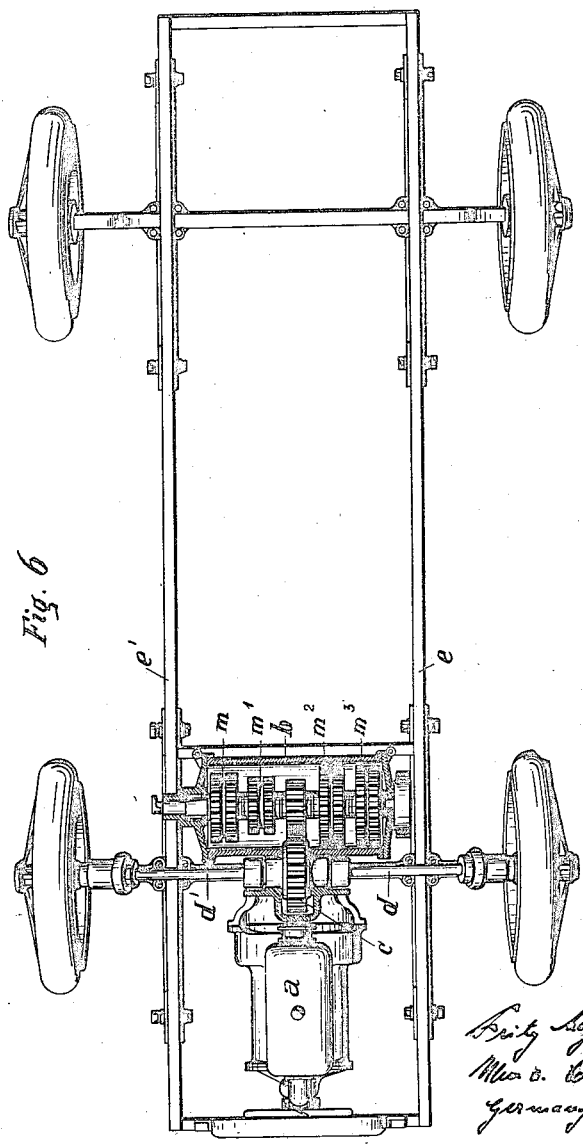

Patented Nov. 6, 1923.

1,473,194

UNITED STATES PATENT OFFICE.

FRITZ MAYER, OF ULM-ON-THE-DANUBE, GERMANY, ASSIGNOR, BY DIRECT AND MESNE ASSIGNMENTS, TO JOHN KELLER, OF OBERLENNINGEN-TECK, WURTTEM-BERG, GERMANY.

MOTOR CAR.

Application filed July 24, 1920. Serial No. 398,711.

*To all whom it may concern:*

Be it known that I, FRITZ MAYER, a citizen of the German Empire, residing at Ulm-on-the-Danube, Republic of Germany, have invented certain new and useful Improvement in Motor Cars, of which the following is a specification, reference being had there in to the accompanying drawing.

My invention relates to motor vehicles and more particularly motor trucks, and the object of my invention is to so construct the vehicle that the front-part containing the driving mechanism can be made short and compact, at the same time permitting the frame of the car to be low.

Figure 3:
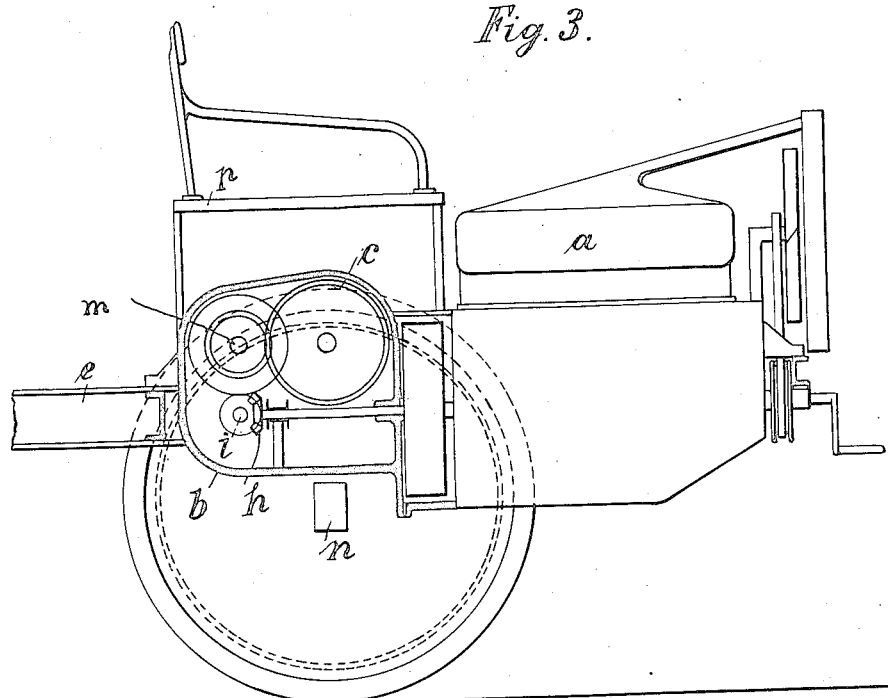
Figure 4:
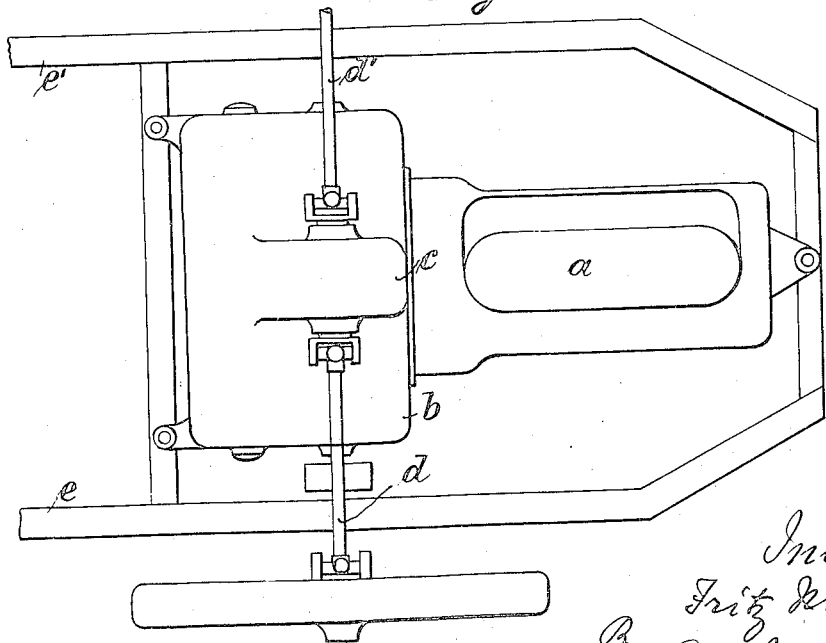

In the accompanying drawings illustrating my invention, Fig. 1 is a cross-section through the front part of a truck embodying my invention; Fig. 2 is a top view of the same with the driver's seat removed; Fig. 3 is a view similar to Figure 1, showing a modification; Fig. 4 is a plan of the front part with the driver's seat omitted. (Figs. 1-4 are diagrammatic views.) Fig. 5 is a longitudinal section through a truck built according to my invention; Fig. 6 is a plan view.

$a$, designates the motor, $b$, the set of speed-change gears and $c$, the differential gear, these three parts being constructed to form one integral whole. From the differential gear $c$, the two articulated shafts $d$, $d'$ which pass above the frame $e$, $e'$ are driving the front wheels. The motor $a$, without the medium of the usual friction coupling, drives by the aid of the bevel-gear-wheel $h$, the lower gear-shaft $i$ which accordingly is continuously rotated by the motor.

According to Figs. 1 and 2, I dispose the gear-shaft $m$, and the differential gear $c$ vertically above the lower gear-shaft $i$, thereby considerably reducing the length of the gearing, as well as preventing the motor from extending too far beyond the front axle. In the modification according to Fig. 3, the shaft of the differential-gear $c$ is disposed in a lower horizontal position. By thus lowering the differential gear $c$ I am able to considerably raise the position of the motor without thereby increasing the height of the car. Because of the said arrangement of the shaft of the motor $a$, the gear-shafts $i$ and $m$ and the shaft of the differential-gear $c$, I obtain a compact construction of short length. The articulated shafts $d$, $d'$ passing above the frame $e$, $e'$ permit a low construction of the truck as will be readily understood, while the arrangement of the entire drive-mechanism as described permits easy access thereto when the driver's seat is removed. Moreover, by this arrangement the same advantages are obtained as with an electrically propelled vehicle, in which the motor is located below the frame coupled directly with the front wheels. Thus, also the rear portion of the truck can be constructed and shaped in any desired manner, as the driving mechanism is located entirely in front. This is of the greatest importance for the construction of trucks for special industrial uses. Moreover, the whole construction is considerably reduced in weight and is more easy to inspect, as there are no parts of the machinery and transmission concealed below the body of the truck. The seat $p$ for the driver being located directly above the differential-gear, the length of the truck is thereby considerably reduced. In Figs. 5, and 6, a motor truck built in accordance with my invention is shown in detail, the reference letters appearing in said figures indicating the same parts as the parts indicated by the same reference letters in Figs. 1-4, $m^1$, $m^2$ and $m^3$, showing the speed-change gears. $n$ designates the front axle.

No claim is made to any novelty in the specific form of the change speed gearing disclosed in Figs. 5 and 6, beyond what is claimed in the claim attached to this specification.

I claim as my invention:

In motor vehicles the combination with the vehicle frame and the front steering wheels mounted thereon, of the motor, the motor shaft, the motor casing, a lower gear shaft, means for directly driving the same from the said motor shaft, an intermediate speed-change gear-shaft, a differential gear, an operative connection between the said gear and the said intermediate speed-change gear-shaft, cardan-shafts driven by said differential gear for driving the said front steering wheels and passing above the said vehicle frame, all the said shafts being transversely arranged, and a casing enclosing the said lower gear shaft, the said speed-change gear-shaft and the said differential gear, the said casing and the said motor casing forming one integral whole.

In testimony whereof I have affixed my signature in presence of two witnesses.

FRITZ MAYER.

Witnesses:
 MAX MILLER,
 JOHN KELLER.